United States Patent [19]

Eggenmuller

[11] Patent Number: 4,986,063
[45] Date of Patent: Jan. 22, 1991

[54] METHOD AND APPARATUS FOR COMPACTING GRASS, LEAFAGE OR SIMILAR MATERIAL

[76] Inventor: Alfred Eggenmuller, Schutzenweg 10, D-7915 Elchingen 1, Fed. Rep. of Germany

[21] Appl. No.: 423,273

[22] Filed: Oct. 18, 1989

[30] Foreign Application Priority Data

Oct. 19, 1988 [DE] Fed. Rep. of Germany ....... 3835570
Jan. 14, 1989 [DE] Fed. Rep. of Germany ....... 3900969

[51] Int. Cl.$^5$ ............................................. A01D 34/70
[52] U.S. Cl. ......................................... 56/16.6; 56/202
[58] Field of Search ................... 56/1, 13.6, 13.7, 13.8, 56/13.9, 14.3, 16.9, 194, 196, 197, 199, 200, 202, 203, 206, 295, DIG. 2; 15/79 A, 83

[56] References Cited

U.S. PATENT DOCUMENTS

| | | | |
|---|---|---|---|
| 3,191,367 | 6/1965 | Schwalm | 56/13.8 |
| 3,222,853 | 12/1965 | Michael | 56/202 |
| 3,242,658 | 3/1966 | Morales . | |
| 3,641,754 | 2/1972 | Anstee | 56/16.9 X |
| 3,791,118 | 2/1974 | Behrens | 56/202 |
| 3,808,627 | 5/1974 | Doering et al. | 56/202 X |
| 3,899,866 | 8/1975 | Klier | 56/13.8 |

FOREIGN PATENT DOCUMENTS

| | | | |
|---|---|---|---|
| 2174859 | 10/1973 | France . | |
| 2235639 | 1/1975 | France . | |
| 1140284 | 1/1969 | United Kingdom | 56/13.8 |

*Primary Examiner*—Stephen J. Novosad
*Assistant Examiner*—David J. Bagnell
*Attorney, Agent, or Firm*—Lowe, Price, LeBlanc, Becker & Shur

[57] ABSTRACT

In order to achieve a small and simple compacter with high compression for garden equipment like lawn mower there is disclosed a method and apparatus for compacting grass, leafage or similar material, which is comminuted and compacted simultaneously in a single compactor device with a single drum with arc-shaped tines cooperating with a press-channel.

15 Claims, 5 Drawing Sheets

METHOD AND APPARATUS FOR COMPACTING GRASS, LEAFAGE OR SIMILAR MATERIAL

FIELD OF THE INVENTION

The invention relates to a method and an apparatus for compacting of grass, leafage or similar material by lawn and garden equipment, as lawnmowers, cutting, sucking or sweeping apparatuses.

TECHNICAL BACKGROUND

U.S. Pat. No. 3,641,754 discloses such a method for compacting grass or leafage. The material lifted from the ground is first fed to a shredder for comminuting the clipped grass such that is may be compacted more effectively thereafter in a press device and deposited in a container which has to resist the considerable forces resulting from the tightly compressed material forced in. Since the material is comminuted prior to the press operation a higher compression is achieved. The shredder is provided transversely to the mowing direction and has arranged at its exit a pair of consolidating augers followed by a compression auger arranged in mowing direction, and compacting the collected material in an easily manageable container or in a heavy bag.

The known equipment compacting mowed grass by the steps of shredding, consolidating, and then compressing is rather complex in design using a shredder, a pair of lateral feeding means, and longitudinally arranged compressing means. Specifically, the transmission and branching of driving power for the separate devices is complex. The device has a considerable weight and is space and energy consuming. Therefore, the known compacter is hardly adaptable for smaller garden equipment, as lawnmowers.

U.S. Pat. No. 3,242,658 discloses a lawnmower with baler with similar disadvantages as in above discussed equipment. By means of a feeding auger the clipped grass is conveyed to a press channel provided with a reciprocating pressure piston. Due to the high number of elements this apparatus is relatively heavy and space-consuming. Furthermore, the clipped grass is no more comminuted prior to compacting, resulting in a low compression.

Similar lawnmowers have been disclosed in the U.S. Pat. Nos. 3,222,853 and 3,791,118, all using a compression auger having a longitudinal axis essentially extending in the mowing direction. However, none of these known lawnmowers uses a shredder means arranged up-stream of the compacter.

SUMMARY OF THE INVENTION

It is an object of the instant invention to provide a method and an apparatus for compacting grass, leafage, or similar material achieving a high compacting effect with low power requirements.

It is a further object of the instant invention to provide an apparatus for compacting grass, leafage, or similar material having reduced space requirements and a simple design.

It is a still further object of the instant invention to provide an apparatus for compacting grass, leafage, or similar material particularly adapted for small or compact garden equipment, as lawnmowers and the like appliances.

Accordingly, the invention provides a method for compacting grass, leafage, or similar material during the feeding thereof from a movable motor-driven cutting-/collecting apparatus through a press channel comprising the steps: combined comminuting and feeding of said material; and simultaneously compacting said comminuted material during further feeding through said press channel loaded by said material already accumulated therein.

In contrast to the lawnmower of U.S. Pat. No. 3,641,754 in which the clipped grass is first comminuted, then laterally consolidated and then compacted by a separate unit each, with the apparatus of the instant invention all these method steps are performed together by one single device, resulting in a considerable reduction in the number of parts and space.

Preferably, in order to reduce the weight of the compacted material the method of the invention comprises the further step of extracting liquid from said material during said comminuting and feeding step.

It is further preferred for maintaining the driving power constant to provide a further step for the method of the invention of varying a width of said press channel dependent on said loading of said material fed therethrough.

According to a further aspect of the invention an apparatus is provided for compacting grass, or leafage, or similar material comprising: a compacter with rotating means for simultaneously comminuting and feeding of said material from an inlet thereof; and a press channel connected to that computer and for receiving said comminuted material from said rotating means such that said material is compacted in said press channel by said rotating means feeding said comminuted material against said material already accumulated in said press channel.

With the apparatus of the invention the clipped grass or leafage is comminuted by tearing, crushing and/or smashing and is simultaneously fed into a press channel connected at the exit of the compacter thus compressing and felting up the comminuted clipped grass against material being already packed within the press channel. This results in a particularly high compacting effect.

The compacter of the invention uses just a single rotating shaft, i.e. the tine shaft. The housing and the press channel are designed very simple such that the compacter is light-weighted, space-saving, and needs low driving-power. These are the major requirements for using a compacter for small garden equipment as lawnmowers, cutting, sucking, and sweeping apparatuses.

DESCRIPTION OF THE PREFERRED EMBODIMENTS

Figure 1:
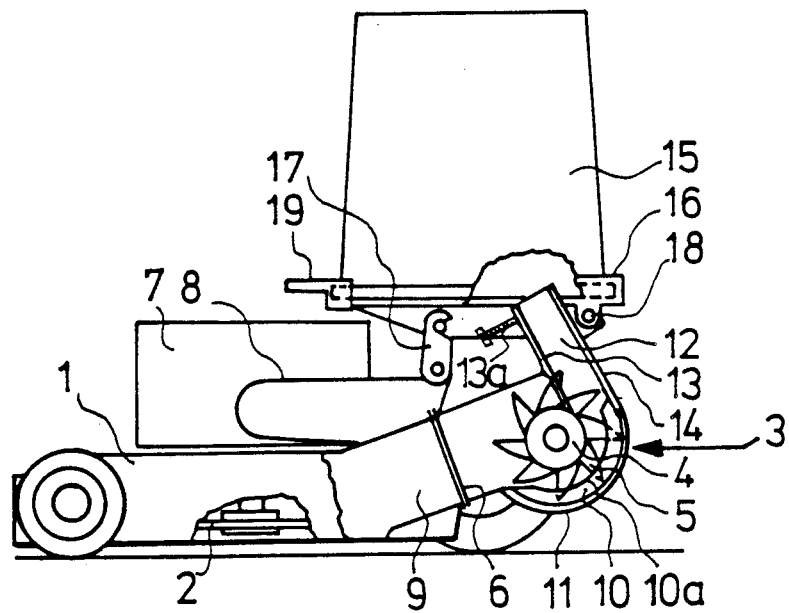
FIG. 1 is an elevational view of a lawnmower provided with a compacter according to the invention.
Figure 2:
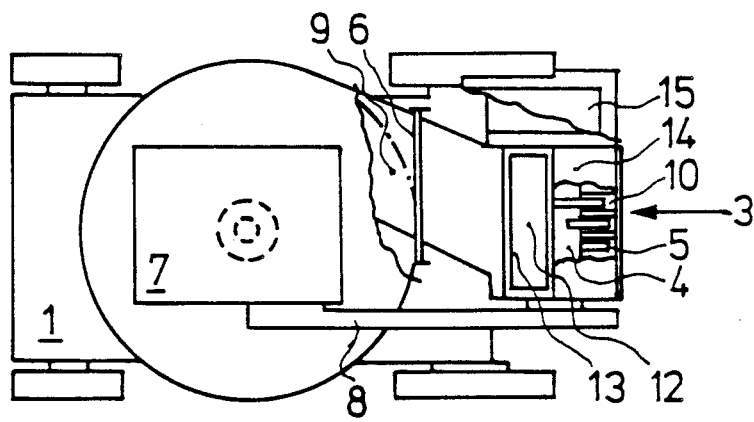
FIG. 2 is a plane view of the lawnmower according to FIG. 1.

Referring to FIGS. 1 and 2, a lawnmower 1 is provided with a rotatable knife blade 2 and has attached thereto at its rear side a compacter 3 including a tine rotor 4 having peripherally distributed rigid tines 5 and rotating within an essentially cylindrical press housing 11. The compacter 3 is coupled to the lawnmower 1 by a flange 6 and its tine rotor 4 is adapted to be driven from a driving motor 7 of the lawnmower 1 via a belt 8.

Grass clipped by the lawnmower 1 is fed through an ejecting station 9 into the region of the tines 5 of the tine rotor 4 which in turn feeds the grass through grooves 10 formed between ribs 10a attached at the inner peripheral wall of the press housing 11 into a press channel 12 connected thereto. This press channel 12 is formed of a slotted front wall 13 having passed therebetween the tines 5 of the rotating tine rotor 4 and a rear wall 14 forming a continuation of the press housing 11. Preferably, the width of the press channel 12 is adjustable by an adjusting device 13a in order to vary the resistance within the press channel 12. Narrowing the width of the press channel 12 by pivoting the front wall 13 increases friction within press channel 12, thus increasing counter-pressure to the rotating tines 5 which results in higher density of compacted grass. Vice versa the counter pressure is reduced by widening the press channel 12.

The press channel 12 preferably ends in a container 15 mounted on a folding frame 16. After releasing a bracket 17 both the press channel 12 and the container 15 may be pivoted about a shaft 18 and the container 15 may be removed after releasing a clamping device 19.

As may be particularly gathered from FIG. 2 the tines 5 project into the longitudinal grooves 10 formed by longitudinal ribs 10a of the press housing 11 such that the grass clipped by the lawnmower 1 is further chopped at the front ends of the tines 5 in cooperation with the ribs 10a by shredding, cutting, crushing and/or smashing and is then compacted in the press channel 12 against the resistance (friction, weight) of the grass being already accumulated therein. Due to the specific form of the tines 4 in combination with grooves 10 two operating steps, i.e. comminuting and compressing with a high pressure against grass being already compressed in the press channel 12 is achieved by a single movement and a single device essentially at the same time. For starting the compacting operation the width of the press channel 12 is reduced to increase counter-pressure.

In operation the tines 5 with arc-shaped front ends 5a conveying clipped grass along the press housing 11 into press channel 12 press arriving comminuted grass in a wiping action against material being already compressed in the press channel 12. Thus, front ends 5a wipe entering grass to already compacted grass such that this grass material is further compressed and felted.

Figure 3:
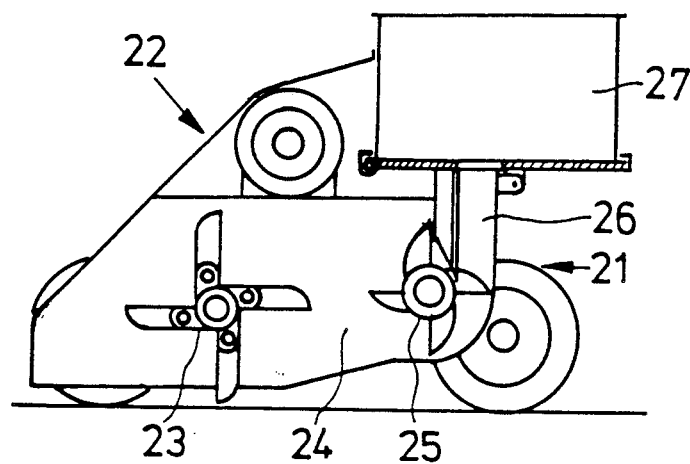
FIG. 3 is an elevational view of a vertical cutter having connected thereto a compacter according to the invention.

FIG. 3 illustrates a cutting apparatus 22 (verticutter) used for unfelting of lawn and having connected thereto at its exit a compacter 21 according to a further embodiment of the instant invention, similar to compacter 3 of FIG. 1. A rotatable knife shaft 23 of the cutting apparatus 22 cuts felted lawn in a vertical plane and feeds the material through a passage or ejecting station 24 directly into the region of the tine rotor 25 pressing the material through a press channel 26 into a container 27 mounted on the cutting apparatus 22.

Figure 4:
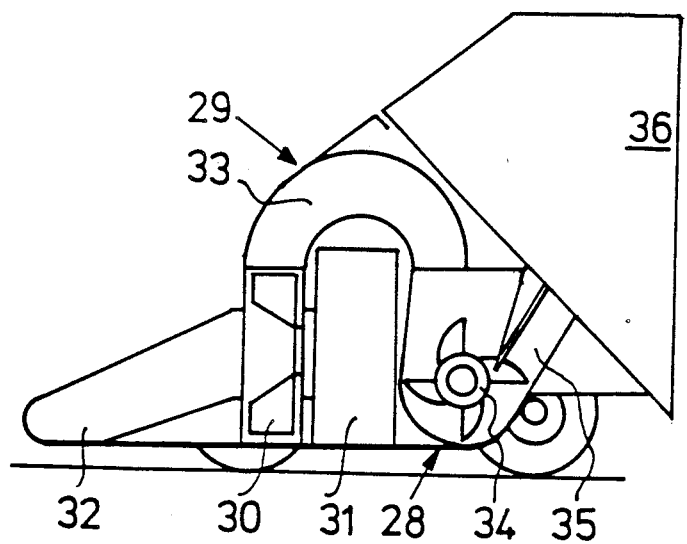
FIG. 4 is an elevational view of a suction apparatus having a compacter according to the invention connected thereto.

Similarly, FIG. 4 illustrates a suction apparatus 29 provided with a motor 31 and particularly adapted for sucking up of leafage. For this sucking a blower 30 is used sucking up leafage or grass through a suction nozzle 32 and blowing thereof through an ejector 33 into the region of the tine rotor 34 of a compactor 28. As explained in more detail in connection with the embodiment according to FIGS. 1 and 2 the tine rotor 34 again comminutes and compacts the sucked leafage in order to press it then through a press channel 35 into a container 36.

Figure 5:
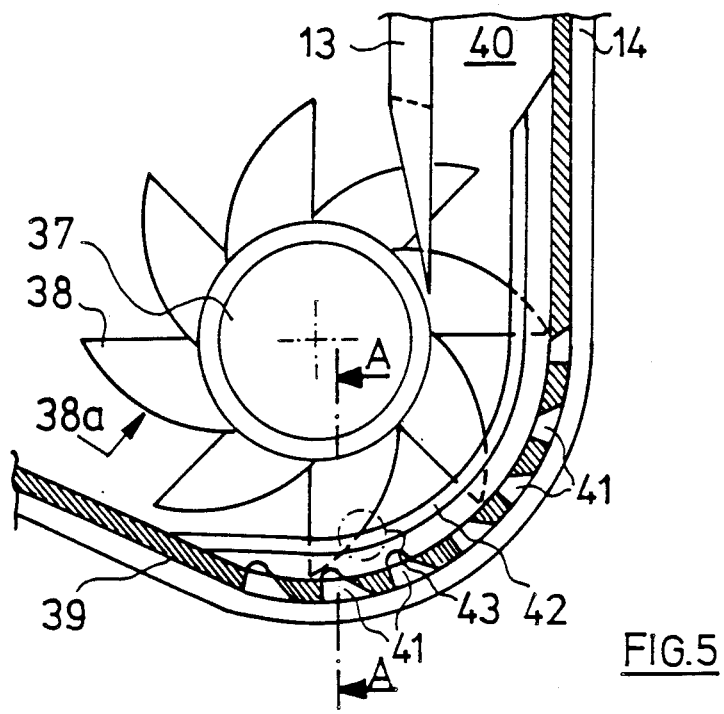
FIG. 5 is an enlarged schematic elevational view of a compacter according to the invention.

FIG. 5 is an enlarged schematic view of the tine rotor 4, 25, or 34 as explained above and designated with the reference numeral 37. Tines 38 of the tine rotor 37 feed grass and leafage through a press housing 39 into a press channel 40. The press channel 40 corresponds to the press channels 12, 26, and 35 of FIGS. 1 to 4. The grass or leafage accumulating in the press channel 40 upon the operation of the tine rotor 37 exerts a strong counter-pressure onto currently fed material such that the surface and cell water of the grass or leafage, is pressed out. Additional liquid will be removed by the cutting and crushing of the material between the front ends 38a of the tines 38 and upper edges of longitudinal ribs 42 at locations indicated with the reference numeral 43. The liquid produced by this operation is diverted to the exterior through openings 41 in the press housing 39, the openings 41 being either provided in the side walls of the longitudinal ribs 42 or just at the bottom in the press housing 39 as illustrated in FIGS. 6 and 7, respectively.

Figures 6, 7:
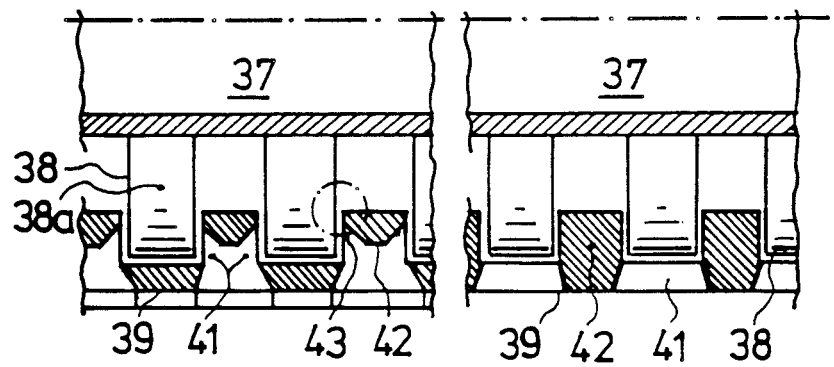
FIG. 6 is a sectional view of the compacter of the invention along the line A—A of FIG. 5.
FIG. 7 is a sectional view similar to that of FIG. 6 of a modified compacter according to the invention.

FIG. 6 is a sectional view along the line A—A of FIG. 5 through the press housing 39 of FIG. 5. It should be noted, that the openings 41 extend through the press housing 39 and the side walls of the ribs 42. The shape of the openings 41 is formed such that their cross section expands outward in order to prevent any obstruction or blocking. As illustrated, the tines 38 of the tine rotor 37 considerably project into the grooves formed between the longitudinal ribs 42 such that at the locations 43 a cutting effect is achieved between the edges of tines 38 and the edges of the longitudinal ribs 42. It should be noted that the tines 38 are fitted snugly into the longitudinal grooves such that in addition to the cutting or shredding effect at locations 43 the clipped material is additionally crushed or smashed between the side walls of the ribs 42 and the bottom of the press housing 39 and the arc-shaped front portion 38a of the tines 38.

FIG. 7 shows a similar sectional view as FIG. 6, however, modified in that the openings 41 are just provided in the bottom wall of the press housing 39.

Figure 8:
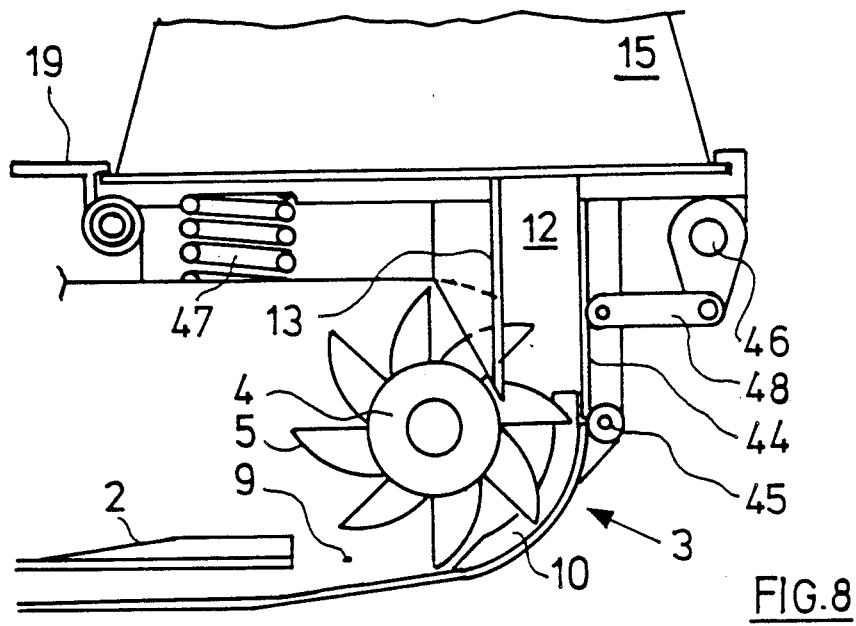
FIG. 8 is a schematic elevational view of an embodiment of the compacter according to the invention modified by providing an adjustable press channel wall.

FIG. 8 illustrates a further embodiment of the compacter 3 of the invention compacting material to be accumulated in a container 15 through a press channel 12. The container 15 is supported pivotably about a shaft 46 and further is supported on a spring 47. There is provided a linkage 48 for adjusting a pivotable rear wall 44 of a press channel 12. In operation, the increasing weight of the material accumulating in the container 15 urges down the spring 47 such that the linkage 48 is moved to the right (FIG. 8) by pivoting about the shaft 46; thus, the rear wall 44 of the press channel 12 is in turn slightly moved to the right widening the press channel 12 pivoting about joint 45; this results in a reduced counter-pressure such that the driving power necessary for the compacter 43 may be maintained essentially constant with increasing load.

Figure 9:
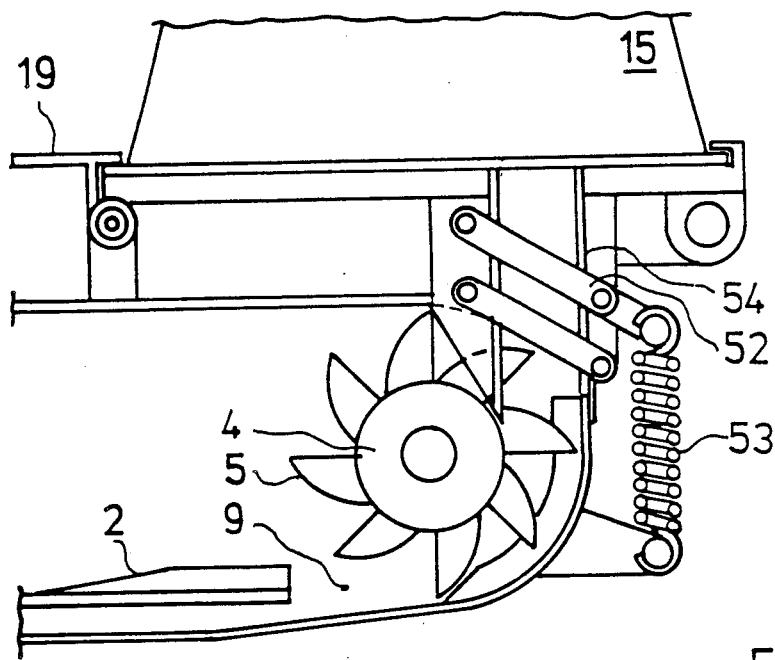
FIG. 9 is a view similar to that of FIG. 8 of a further modified embodiment of the compacter of the invention.

FIG. 9 shows a modified embodiment used in connection with a lawnmower 1 of FIG. 1. A tine rotor 5 arranged as close as possible to the knife blade 2 of the lawnmower, cooperates again with the longitudinal ribs 10 resulting in a further comminuting of the grass clipped by the knife blade 2. Thereafter, the material is fed into a press channel having an adjustable channel wall 54. The rear wall 54 is supported by levers 52 under tension of a spring 53. Upon increasing filling of the container and, in turn, increasing frictional resistance in the press channel the rear wall 54 is widened against the biasing force of the tension spring 53.

Figure 10:
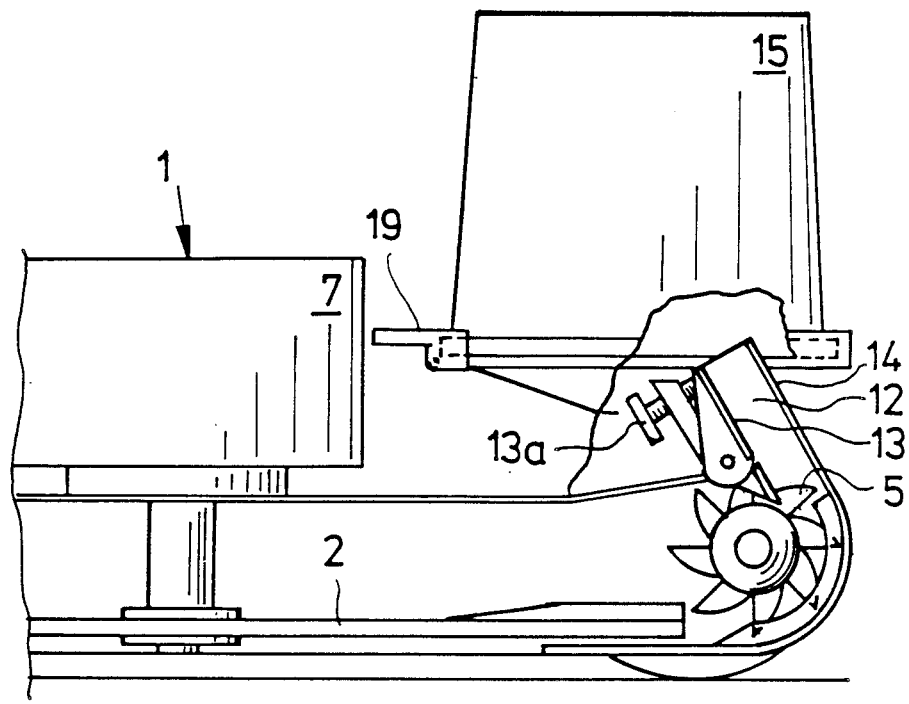
FIG. 10 is a schematic elevational view of a lawnmower provided with a compacter according to a preferred second embodiment of the invention.
Figure 11:
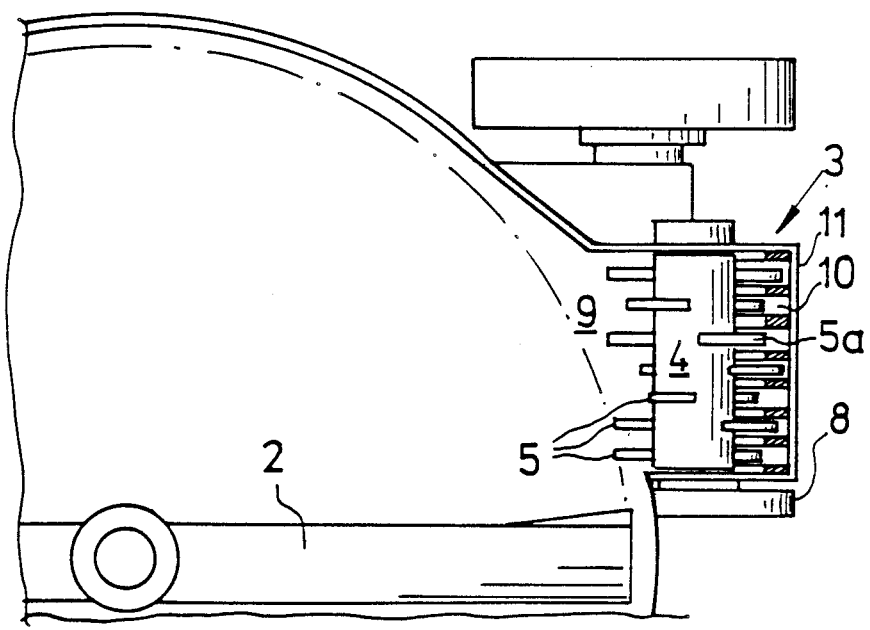
FIG. 11 is a plane view of the lawnmower according to FIG. 10.

FIG. 10 shows a further modification of the use of a compacter of the invention in a lawnmower similar to that of FIG. 1 with the further advantage that the compacter 3 is arranged as close as possible to the rotating blades 2 of the lawnmower. The tine rotor 4 may extend over the total width of the lawnmower 1. Alternatively, FIG. 11 shows in a plane view a modification using a compacter extending over a partial portion of the lateral width of the lawnmower 1 only.

As illustrated, the material clipped by the knife blades 2 is directly thrown through an ejector portion 9 into the region of the tine rotor 4 where it is further comminuted by cooperation of the tine rotor 4 with the longitudinal ribs 10a and grooves 10 provided at the interior periphery of the press housing 11. Thereafter the material is compacted in the press channel 12 and fed into the container 15 as explained in connection with the embodiment of FIGS. 1 and 2.

It should be mentioned, that compacted grass or leaf may be laid to the ground as a swath without being collected in said containers or bags, as in the compacter 3 comprising tine rotor 4, press housing 11 with ribs 10a, and press channel 12 (FIGS. 1 and 2). The grass is already highly compressed even without pressing against inner walls of a container; as the main compression occurs in the press channel 12 the container 15 and its frame 16 may be rather light-weighted.

When using a container it is preferable to arrange the container in a substantially elevated position on the apparatus with the press channel being directed upward. This causes an additional counter-pressure and an even more dense compacting.

While there have been described and illustrated several specific embodiments of the invention, it will be clear that variations in the details of the embodiments specifically illustrated and described may be made without departing from the true spirit and scope of the invention as defined in the appended claims.

I claim:

1. A method for comparing grass, leafage, or similar material during the feeding thereof from a movable motor-driven cutting/collecting apparatus through a press channel, comprising the steps:

(a) combined comminuting by tearing, crushing and smashing of said material and feeding of said material by a single rotating compacter means; and
   (b) simultaneously compacting said comminuted material during further compressing through said press channel loaded by said material already packed therein by said single rotating compacter means.

2. The method of claim 1, further comprising the step of extracting liquid from said material during said comminuting and feeding step.

3. The method of claim 1, further comprising the step of varying a width of said press channel dependent on said loading of said material fed therethrough.

4. The method of claim 1, further comprising the step of collecting said comminuted and compacted material in a container, provided at the end of said press channel.

5. A method for compacting grass, leafage, or similar material, comprising the steps:

providing a motor-driven movable cutting/collecting means;
   mounting a container on said cutting/collecting means in a substantially elevated position thereof;
   providing a single rotating compacting means between an ejecting station for said material and said container for compacting said material during feeding thereof to said container;
   combined comminuting by tearing, crushing and smashing of said material and simultaneous feeding thereof toward said container; and
   compacting said material after said comminuting and feeding step by loading thereof by said material already collected in said container.

6. The method of claim 5, further comprising the step of varying the width of said press channel dependent on said loading of said material within said container.

7. An apparatus for compacting grass, leafage, or similar material, comprising:

a compacter with rotating means for simultaneously comminuting and feeding of said material from an inlet thereof; and
   a press channel connected to said compacter for receiving said comminuted material from said rotating means such that said material is compacted in said press channel by said rotating means feeding said comminuted material against said material already accumulated in said press channel wherein said rotating means comprises a tine rotor means rotatably mounted in an essentially cylindrical housing, said tine rotor means having periphery and axially distributed tines with arc-shaped front ends wiping off said comminuted material for entering said press channel having a front wall provided with slots for admitting passage of said tines during rotation of said tine rotor means.

8. The apparatus of claim 7, wherein said tines engage grooves provided at the inner surface of said cylindrical housing.

9. The apparatus of claim 7, wherein said housing is provided with openings for removal of liquid extracted from said material during comminuting thereof.

10. The apparatus of claim 9, wherein said openings are tapered expansively in outward direction.

11. The apparatus of claim 7, further comprising adjusting means for adjusting a width of said press channel means.

12. The apparatus of claim 11, wherein said adjusting means comprise a linkage extending between an adjustable wall of the press channel means and a point provided in fixed relationship to an axle for pivotal supporting said container which is further supported on a spring means.

13. The apparatus of claim 11, wherein said adjusting means comprising a lever means supported by a spring means.

14. The apparatus of claim 7, wherein said inlet of said compacter is arranged close to operating means of said cutting, collecting, or similar means.

15. The apparatus of claim 7, wherein said press channel is connected to a container for collecting said material.

* * * * *